United States Patent [19]

Grassmann

[11] 4,268,758

[45] May 19, 1981

[54] ARRANGEMENT FOR SUPPRESSING HIGH FREQUENCY CURRENTS IN BEARINGS OF SHAFTS

[75] Inventor: Hans-Christian Grassmann, Igelsdorf, Fed. Rep. of Germany

[73] Assignee: Siemens Aktiengesellschaft, Berlin & Munich, Fed. Rep. of Germany

[21] Appl. No.: 69,993

[22] Filed: Aug. 27, 1979

Related U.S. Application Data

[63] Continuation-in-part of Ser. No. 891,895, Mar. 30, 1978.

[30] Foreign Application Priority Data

Sep. 8, 1978 [DE] Fed. Rep. of Germany ....... 2839246

[51] Int. Cl.³ .............................................. H03H 1/00
[52] U.S. Cl. .................................... 307/105; 308/1 R
[58] Field of Search .................... 307/105; 310/71, 72, 310/90; 308/1 R

[56] References Cited

U.S. PATENT DOCUMENTS 3,881,137  4/1975  Thanawala .......................... 307/105

FOREIGN PATENT DOCUMENTS 1217229  5/1960  France .

*Primary Examiner*—Joseph W. Hartary
*Assistant Examiner*—S. D. Schreyer
*Attorney, Agent, or Firm*—Kenyon & Kenyon

[57] ABSTRACT

In order to suppress the high-frequency currents in bearings of shafts, the bearing capacity is arranged in the configuration of an electric quadrupole in such a manner that the high frequency voltage becomes a minimum. In the case of ungrounded shafts, a further impedance is provided between the bearing housing and the housing of the treatment chamber such that the sum of this further impedance and the impedance of the shaft are great compared to the bearing impedance. Additionally, a low resistance in the form of a sliding contact is shunted across the bearing impedance. The further impedance according to one embodiment is a capacitance and in another embodiment is a parallel L-C resonant circuit which is connected in series with the bearing. The capacitance of the L-C circuit is formed by an insulating plate and the inductance by a winding.

4 Claims, 4 Drawing Figures

ARRANGEMENT FOR SUPPRESSING HIGH FREQUENCY CURRENTS IN BEARINGS OF SHAFTS

This application is a continuation-in-part of Application Ser. No. 891,895 filed on Mar. 30, 1978.

BACKGROUND OF THE INVENTION

This invention relates to arrangements for suppressing high-frequency currents in bearings of shafts in treatment apparatus having operating frequencies about 10 kHz.

It is known to short circuit the bearings of shafts in order to avoid radio and television interferences (see, for instance, German Pat. No. 146,636). In connection with electric d-c and a-c machines it is further known to avoid detrimental bearing currents by an insulated construction of the bearing (see, for instance, German Auslegeschrift No. 1 161 992). French Pat. No. 1,217,229 discloses an arrangement in which the bearings are insulated and the shaft is short circuited. The known arrangements, however, are ineffective for high frequency currents above 10 kHz, since, due to the geometric dimensions of the insulation structure of the bearing, especially for larger shaft diameters from 20 mm up, a capacity is obtained, the reactance of which is not high enough in relation to the capacity of the bearing. This brings about an excessively high bearing voltage due to the capacitive voltage division. It has been found that the bearing voltage must not exceed approximately 0.7 V, since, otherwise, fritting takes place in the bearing, which leads to the electroerosive destruction of the bearing. It is furthermore necessary in some applications, on the basis of interference elimination principles as well as for reasons of insulation, to bring the shaft ends of rotating parts in high frequency current carrying apparatus to ground or chassis potential as far as possible. In other applications, the shaft is not to be grounded, so that its electric potential becomes more or less undefined. In such a case, the shunt resistance to the series branch is mainly determined by the coupling capacity between the shaft and the housing and therefore can no longer be considered as small in relation to the bearing impedance.

Bearing currents are a particular problem in certain installations. For example, in capacitive drying installations for paper, the bearing support of the shaft constitutes a particular problem since the bearings are continually being destroyed by the high frequency currents induced by the equipment carrying out the capacitive drying.

SUMMARY OF THE INVENTION

It is an object of the present invention to bring the shaft ends to a potential close to ground and to reduce detrimental bearing currents to a tolerable magnitude by simple means, or to avoid them altogether.

It is another object of the present invention to keep the bearing currents small in cases where the potential of the shaft is not near ground.

According to the present invention, an arrangement is provided in which impedances are connected in series with the resulting capacitive bearing impedance in such a manner that the series branch has high impedance and by shunting a low impedance across this series branch in such a manner that an electric guadrupole, which causes the high frequency voltage at the bearing impedance to reach a minimum, results. With this specially designed pi filter, a potential close to ground is obtained and, in addition, the high frequency currents are conducted away from the bearing.

The shunting low impedance of the pi quadrupole is advantageously realized as a sliding contact. As the high impedance, a capacitor or a parallel resonant circuit tuned to the operating frequency is used. For reducing the bearing currents further, it may be advantageous to also provide a further impedance in the form of a sliding contact directly parallel to the bearing capacity.

For checking and monitoring the operational reliability of the quadrupole, the voltage at the series circuit of the high impedance and the bearing capacity can advantageously be monitored and utilized for enabling alarm signals.

According to another aspect of the invention, in the case where the potential of the shaft is not near ground and the capacitive parallel impedance to the series branch is large as compared to the bearing impedance, an arrangement is provided in which impedances are connected in series with the resulting capacitive bearing impedance in such a manner that the series branch has a high impedance and in which the bearing impedance is shunted by an impedance which is low in comparison to the bearing impedance. This shunting low impedance can advantageously be formed by a sliding contact which is arranged parallel to the bearing impedance.

BRIEF DESCRIPTION OF THE DRAWINGS

FIG. 2 illustrates the mechanical design of a bearing support of a shaft in a high frequency apparatus of which FIG. 1 is the equivalent electrical circuit.

FIG. 4 shows a mechanical design of a bearing support of a shaft in a high-frequency apparatus of which FIG. 3 is the equivalent electrical circuit.

DESCRIPTION OF THE PREFERRED EMBODIMENTS OF THE INVENTION

Figure 1:
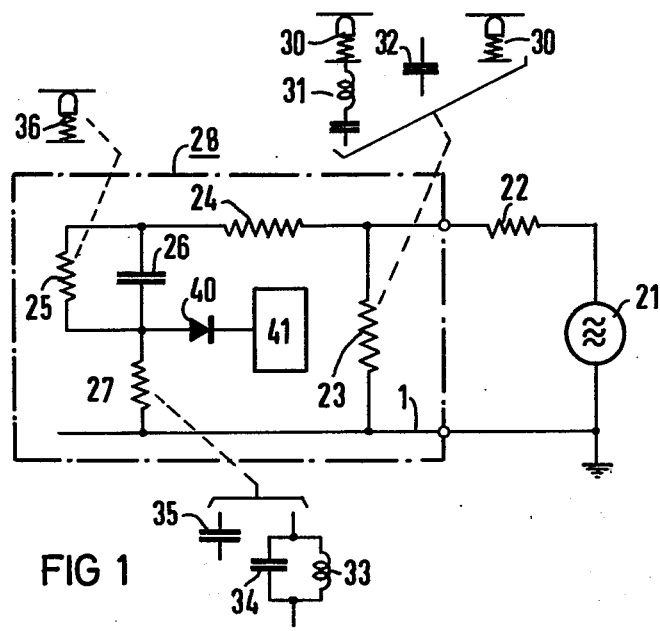
FIG. 1 shows an equivalent electrical circuit of the high frequency arrangement according to one aspect of the present invention.

In the equivalent electric circuit shown in FIG. 1, the high frequency source which induces voltages in the shaft is designated 21. Assume that the frequency of these voltages is, say, around 30 MHz. The internal impedance of this voltage source is represented by resistor 22. In an ordinary bearing, a bearing capacity 26 through which the high frequency current would then flow off the housing also exists. To prevent this from happening, and in order to control the potential of the shaft so as to be as near to ground as possible, the bearing capacity 26 is arranged in the configuration of an electrical pi quadrupole 28. On the input side, this pi quadrupole has a shunt arm with an impedance 23 which has an impedance much lower than the bearing impedance. Into the series arm is connected a relatively high impedance 24, which can be realized, for instance, as a capacitor or as an inductance, or is represented by a section of the shaft. In the next shunt arm, which contains the bearing capacity 26, a relatively high impedance 27 is additionally provided in series with the bearing capacity which determines the bearing impedance. Shunted across the bearing capacity 26 is a further resistor 25 having a resistance low in relation to the bearing impedance.

The low impedance 23 can be, for instance, a sliding contact 30 sliding on the shaft, a capacitor 32 or a sliding contact 30 in series with a series resonant circuit 31. As the series impedance 27, either a capacitor 35 which is small relative to the bearing capacity 26, or a parallel resonant circuit in the form of a capacitor 34 and inductance 33, tuned to the operating frequency, can be used. The low resistance resistor 25 is advantageously also a sliding contact 36. The arrangement described here has the property that it lowers the potential after the impedance 22 to a great extent and keeps the residual currents or residual voltages that remain largely away from the bearing.

The voltage at the midpoint between the bearing capacity 26 and the high impedance 27 can be utilized for monitoring the quadrupole for proper functioning; more specifically, by rectifying the high frequency voltage prevailing there by means of the diode 40 and making it available as a measuring signal to a monitoring device 41.

Figure 2:
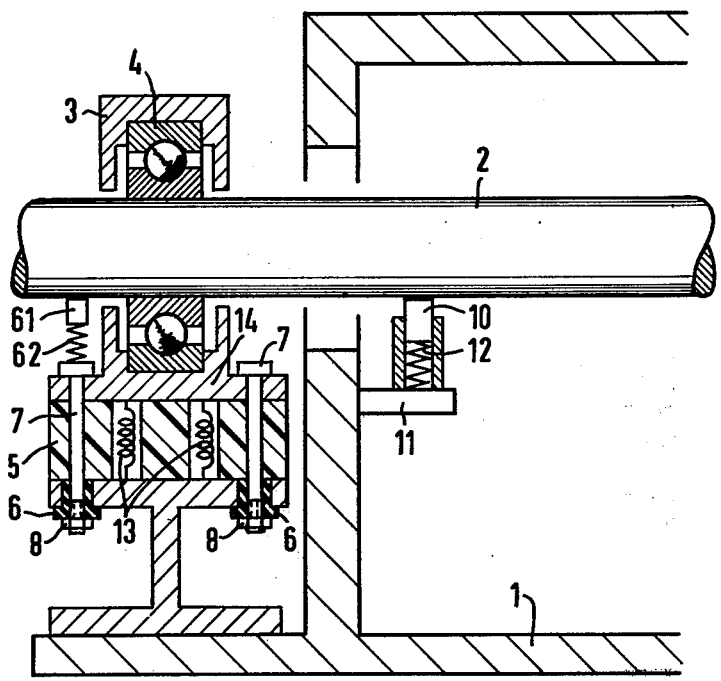

FIG. 2 shows the mechanical design of the equivalent circuit of FIG. 1. A shaft 2 leading through the housing wall 1 of a high frequency treatment chamber is supported in a bearing 4 outside the HF chamber. This part corresponds to the voltage source 21, the internal impedance 22, the series impedance 24 (if applicable) and the bearing capacity 26. As the low impedance 23, in the context of the quadrupole 28 shown in FIG. 1, sliding contact 10, which is fastened to the housing 1 by means of compression springs 12 and a mounting arm 11, is used.

The bearing 4 is enclosed by a bearing housing 3, which is fastened on a support plate 14. Support plate 14 rests on an insulating plate 5 and is fastened via screws 7, insulating washers 6 and nuts 8. In analogy to the equivalent electric circuit of FIG. 1, the insulating plate 5 corresponds to the capacitor 35 or the capacitor 34 of the parallel resonant circuit, if holes in which a tunable inductance 13 is accommodated are further located in the insulating plate 5. Inductance 13 in the insulating plate 5 corresponds to the inductance 33 in the equivalent circuit according to FIG. 1.

The impedance 25 of FIG. 1, which is shunted across the bearing capacity 26 is represented in FIG. 2 by the sliding contact 61 and the compression spring 62; the sliding contact slides on the shaft 2 and the compression spring is connected to the bearing housing 3 in an electrically conducting manner.

This arrangement described here has the property of bringing the shaft to a potential close to that of the housing and of preventing bearing currents from flowing via the bearing 4.

Figure 3:
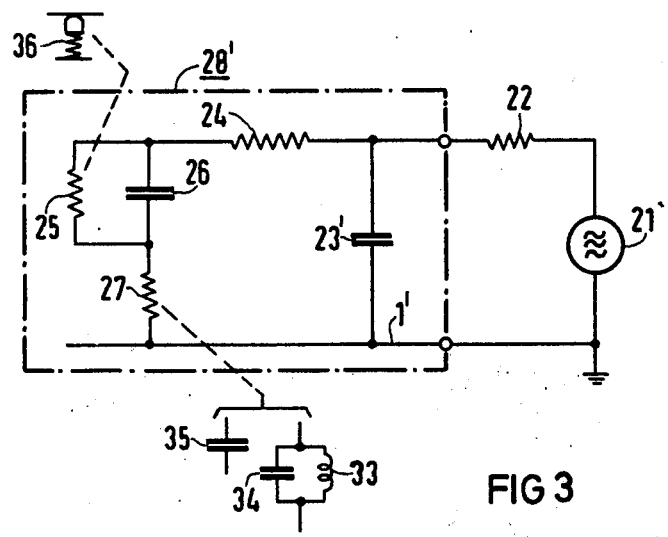
FIG. 3 shows an equivalent circuit diagram of the high-frequency arrangement according to another aspect of the present invention.

In the equivalent electric circuit diagram shown in FIG. 3, the high-frequency source which induces voltages in the shaft is designated 21. Assume that the frequency of these voltages is, say, around 30 MHz. The internal impedance of this voltage source is represented by resistor 22. In an ordinary bearing, bearing capacitive impedance 26, formed by the bearing capacity, through which the high-frequency current can then flow off to the housing, is also present. Also present is the capacitive impedance 23', which is formed by the capacities between housing and shaft.

To prevent current from flowing through the bearing capacity, the bearing impedance 26 is arranged within an electric quadrupole 28'. At the input, this quadrupole has a shunt branch with the capacitive impedance 23' which is high as compared to the bearing impedance 26.

In the series branch there is an impedance 24 which includes at least the inductance of the shaft. In the next shunt branch, which contains the bearing impedance 26, there is provided additionally in series with the bearing capacity which determines the bearing impedance 26, a high impedance 27 which is large in comparison therewith. At the same time, there is arranged parallel to the bearing impedance, a resistance 25 which is low as compared to the bearing impedance and preferably consists of a sliding contact 36.

A capacitor 35 which is small relative to the bearing capacity or a parallel resonant circuit tuned to the operating frequency in the form of a capacitor 34 and an inductance 33 can be used as impedance 27.

This arrangement has the property of minimizing the bearing voltage in the form of a voltage divider and to prevent bearing currents from flowing through the bearing 4.

Figure 4:
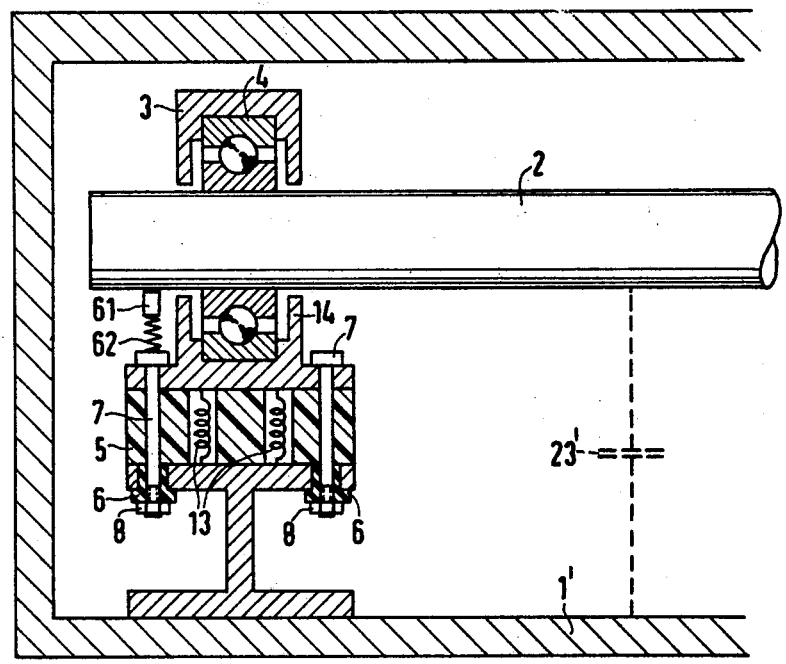

FIG. 4 shows the mechanical design of the equivalent circuit diagram of FIG. 3. A shaft 2 within the housing wall 1' of high-frequency treatment chamber is supported in a bearing 4. This part corresponds to the voltage source 21, the internal impedance 22, the series impedance 24 and the bearing impedance 26. The bearing 4 is enclosed by a bearing housing 3 which is fastened on a support plate 14. Support plate 14 rests on an insulating plate 5 and is fastened via screws 7, insulating washers 6 and nuts 8. In analogy to the equivalent electric circuit diagram of FIG. 3, the insulating plate 5 corresponds to the capacitor 35 or the capacitor 34 of the parallel resonant circuit, if holes in which a tunable inductance 13 is accommodated are further located in the insulating plate 5. Inductance 13 in the insulating plate 5 corresponds to the inductance 33 in the equivalent circuit according to FIG. 3.

The resistance 25 in shunt with the bearing capacity according to FIG. 3 is represented in FIG. 4 by the sliding contact 61 and the compression spring 62. The sliding contact sliding on the shaft 2 and the compression spring being connected to the bearing housing 3 is an electrically conducting manner.

What is claimed is:

1. An arrangement for suppressing high frequency currents in bearings of shafts in high frequency treating apparatus with operating frequencies above 10 kHz, the bearing being mechanically connected to the housing of the treatment apparatus, said bearing being disposed in a housing and exhibiting a capacitive impedance between the shaft and its housing, the bearing shaft exhibiting an inductive impedance at said frequencies and there being a capacitive impedance between the shaft and the housing which is high compared to the bearing capacitive impedance, said arrangement comprising a further impedance connected in series with the bearing impedance between the bearing housing and the housing of the treatment chamber, the sum of said further impedance and the impedance of said shaft being great in comparison to the bearing impedance.

2. The arrangement according to claim 1 and further including a low resistance in the form of a sliding contact shunted across the bearing impedance.

3. The arrangement according to claim 1, wherein said further impedance comprises an electric capacitor.

4. The arrangement according to claim 1, wherein said further impedance comprises a capacitor having coupled thereacross, in parallel, an inductance, said parallel circuit being tuned to the operating frequency to thereby present a high impedance.

* * * * *